United States Patent [19]
Abraham, Jr.

[11] 3,803,770
[45] Apr. 16, 1974

[54] DRIVE CONTROL ARRANGEMENT FOR GRINDERS AND OTHER MACHINES

[75] Inventor: Harry M. Abraham, Jr., Lake Orion, Mich.

[73] Assignee: AA Gage Division, Ferndale, Mich.

[22] Filed: Jan. 3, 1972

[21] Appl. No.: 214,737

[52] U.S. Cl. .......................................... 51/165.78
[51] Int. Cl. ............................................ B24b 51/00
[58] Field of Search ........ 51/165 R, 165.77, 165.78, 51/165.75

[56] References Cited
UNITED STATES PATENTS
3,027,691  4/1962  Schultze ........................... 51/165 R
2,932,130  4/1960  Blood ................................ 51/165 R
3,561,168  2/1971  Robillard ......................... 51/165.75

Primary Examiner—Harold D. Whitehead
Attorney, Agent, or Firm—Barnes, Kisselle, Raisch & Choate

[57] ABSTRACT

A drive arrangement for operating a machine slide to feed a workpiece toward a tool until coming to an in positive limit position and thereafter rapidly return the workpiece until coming to an out positive limit position. The in and out positive limit positions are defined by mechanical stops mounted on the machine base to constrain movement of an abutment member which is operatively connected to the machine slide. In and out limit sensing circuits are responsive to interengagement of the abutment member with the positive stops for providing in and out limit signals. A control circuit responsive to these signals controls the operating sequence of the machine.

10 Claims, 8 Drawing Figures

DRIVE CONTROL ARRANGEMENT FOR GRINDERS AND OTHER MACHINES

The present invention relates to an electromechanical drive arrangement for controlling the movement of a machine slide. The preferred embodiment of the invention disclosed herein is described in connection with a grinding machine.

An important object of the invention is to increase the production efficiency of a precision grinding machine while maintaining precision quality in finished workpieces.

Another object of the invention is to reduce the complexity of the setup procedure for a precision grinding machine.

A further object is to enable the operating sequence of a grinding machine to be easily varied so that optimum grinding efficiency can be readily achieved for the particular shape and material being ground.

Other objects and features of the invention will be apparent in the ensuing description and drawings in which.

Figure 1:
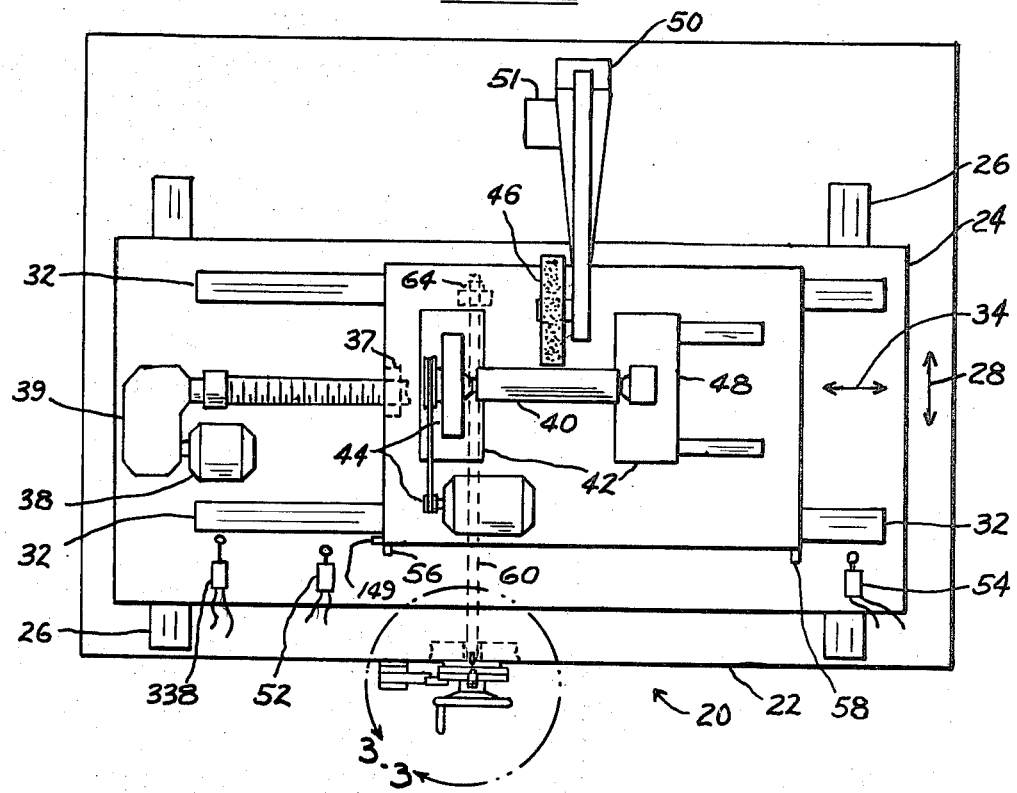
FIG. 1 is a semi-schematic plan view of a grinding machine which embodies the drive arrangement of the present invention.
Figure 6:
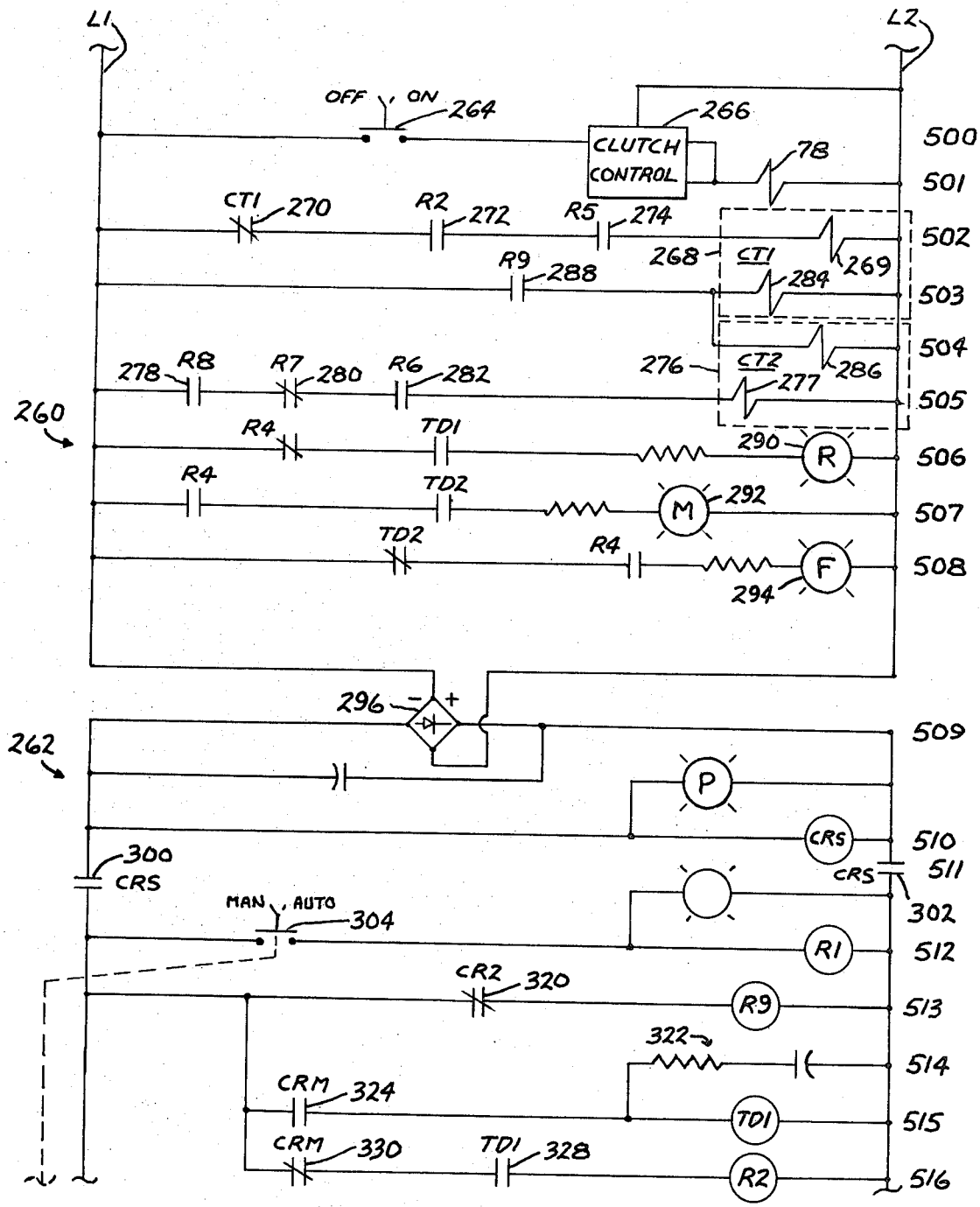
Figure 6A:
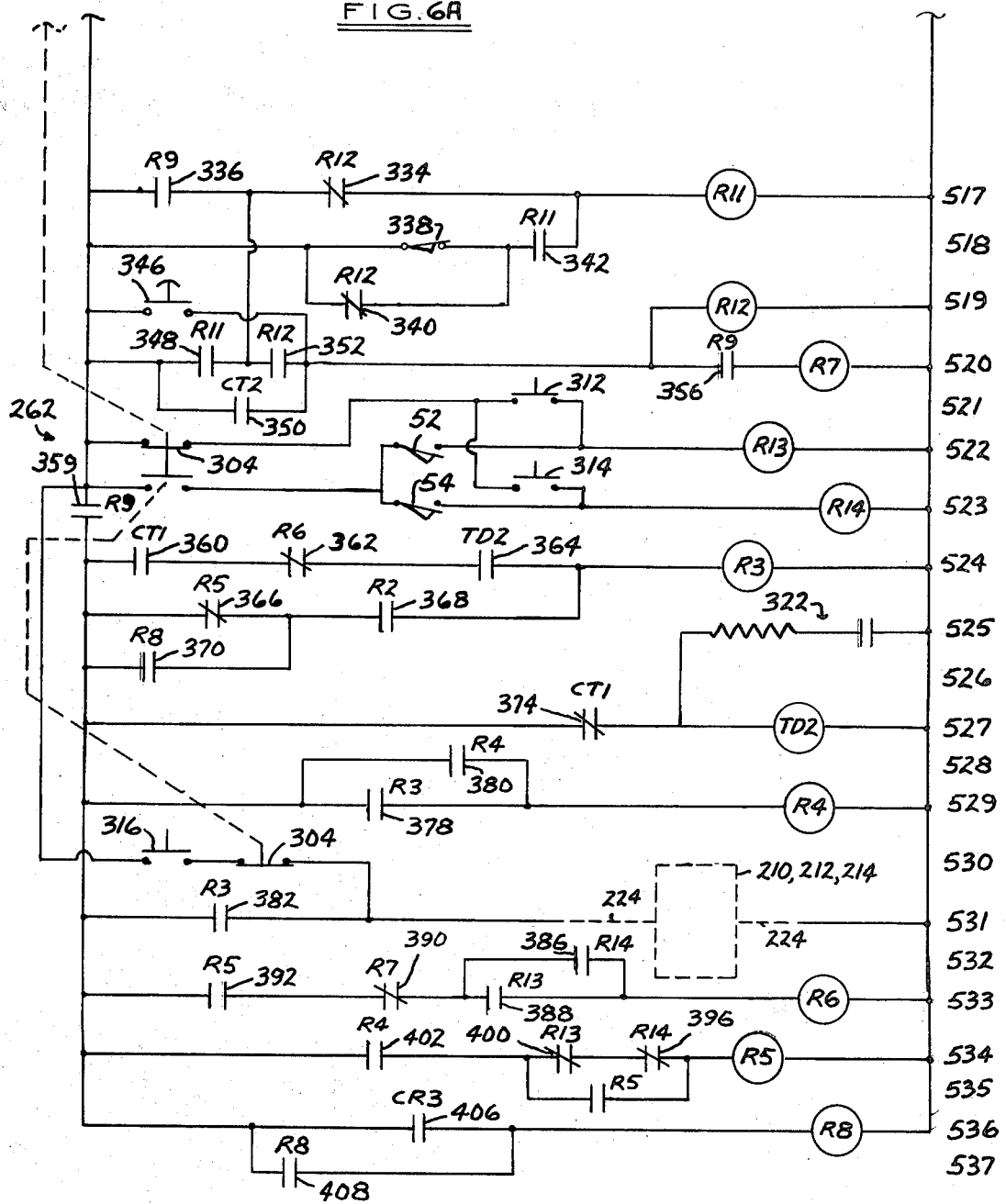

FIGS. 6 and 6A schematically illustrate the portion of the relay control circuitry of the grinding machine of FIG. 1 which is relevant to the present invention.

Figure 7:
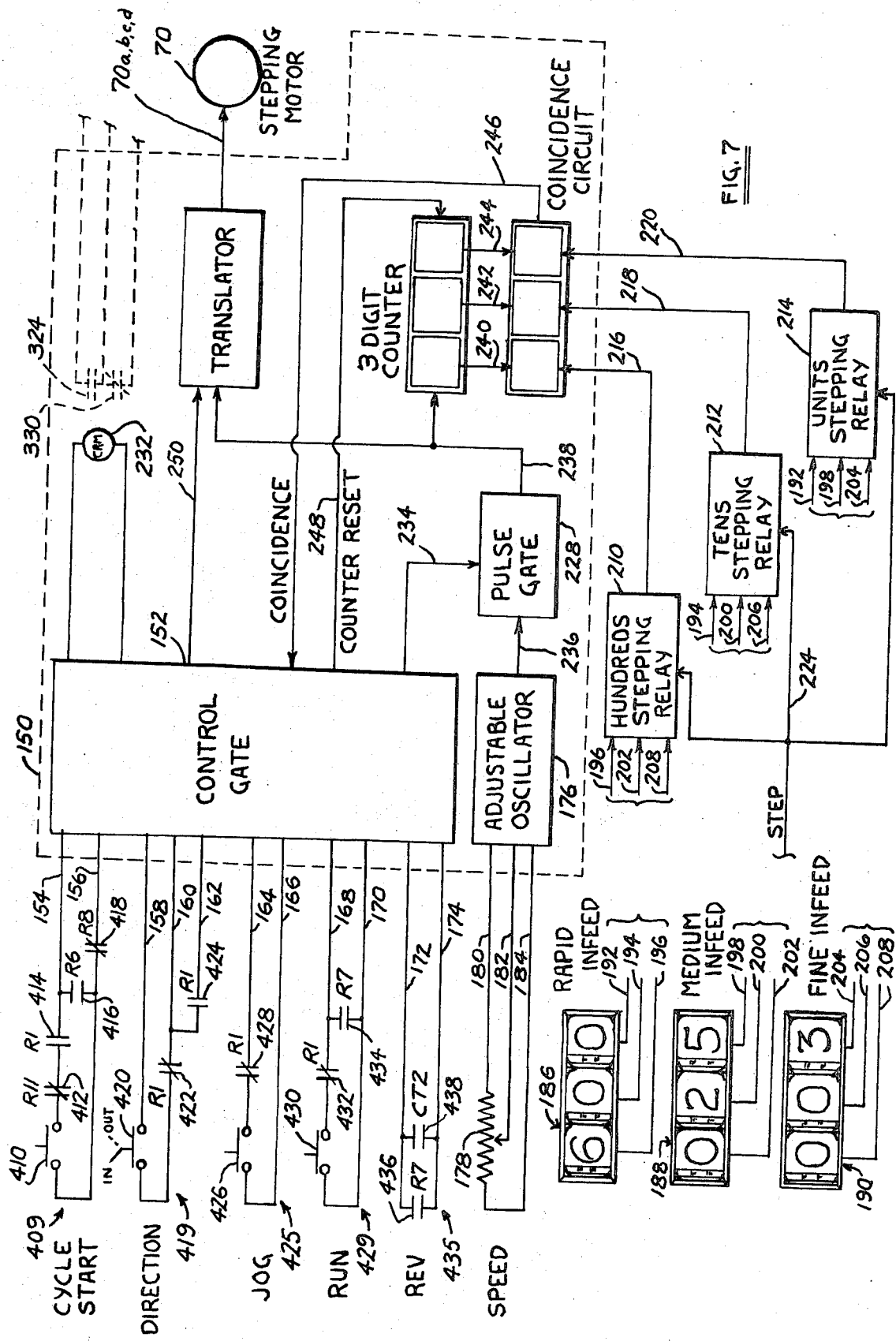

FIG. 7 is a schematic diagram mostly in block diagram form of the electronic control circuitry of the grinder of FIG. 1.

The grinding machine 20 of FIG. 1 comprises a base 22 which supports a horizontal table 24 on a pair of guides 26 for in and out rectilinear movement as indicated by the double-headed arrow 28. Table 24 in turn supports a cross slide 30 on a pair of guides 32 for horizontal lateral movement perpendicular to the movement of table 24 as indicated by the double-headed arrow 34. Cross slide 30 is adapted to be laterally reciprocated by any suitable arrangement such as a lead screw 36 which drives a nut 37 fixedly attached to slide 30. Screw 36 may be actuated, for example, by an electric motor 38 which drives screw 36 through a reducer 39. A rough cylindrical workpiece 40, which is to be ground to a precise diameter, is chucked on cross slide 30 in conventional fashion by a chucking arrangement 42. Workpiece 40 is turned about its axis by a motor-driven reducer arrangement 44 so as to expose its entire cylindrical surface to the circumferential edge of a grinding wheel 46 when laterally reciprocated by operating cross slide 30. The right-hand support 48 for chucking arrangement 42 is laterally adjustable to accommodate various lengths of workpieces. Chucking arrangement 42 may also be of the cam and cam follower type which, while rotating workpiece 40 about its axis, also moves its axis in a path as established by the shape of the cam so that workpieces having other than circular cross sections may be ground. Grinding wheel 46 is fixedly supported on base 22 by a support arm 50 and may be powered in conventional fashion, as by a motor 51.

The outer cylindrical surface of workpiece 40 is ground by moving table 24 and cross slide 30 in the following fashion relative to grinding wheel 46. As workpiece 40 is turned by motor-reducer 44, cross slide 30 is laterally reciprocated between left and right limits as established by limit switches 52 and 54 which are positioned on table 24 to be tripped by dogs 56 and 58 respectively on slide 30. When dog 56 actuates switch 52, wheel 46 is grinding the right-hand end of workpiece 40; when dog 58 actuates switch 54, wheel 46 is grinding the left-hand end of workpiece 40. When cross slide 30 comes to one of its lateral limits, table 24 is advanced inwardly toward wheel 46 a selected amount, or indexed, by the drive arrangement of the invention hereinafter described, so that another layer of material may be removed from workpiece 40 during its subsequent pass across grinding wheel 46. This process is repeated until table 24 has been indexed inwardly a total distance sufficient to reduce workpiece 40 to the required diameter. However, as is customary in high precision grinding, before table 24 is moved outwardly away from wheel 46, cross slide 30 is laterally reciprocated a selected number of times while table 24 remains stationary. This "sparking out" cycle takes off any surface irregularities in workpiece 40 which may be caused by slight irregularities in grinding wheel 46 so that the finished piece is ground to high precision.

While in its broadest aspect, the present invention provides an electromechanical drive arrangement for controlling the movement of a machine member, the drive arrangement as applied to a grinding machine of the illustrated type greatly increases the production efficiency of the grinder while maintaining high precision quality in ground workpieces. As can be appreciated from the above description of grinding machine 20, the precision to which workpiece 40 may be finish ground depends upon the accuracy with which table 24 is moved toward grinding wheel 46. If a positive mechanical stop on base 22 defines the inner limit of travel of table 24 for grinding workpiece 40 to the required diameter, the diameter of workpiece 40 can be precision ground by bringing table 24 into positive abutment with the positive mechanical stop and then sparking out the workpiece. While high precision in the finished workpieces is the ultimate objective, the efficiency with which the precision grinding is performed is an important consideration from an economic standpoint. Therefore, to efficiently and consistently produce high precision workpieces, it is necessary that actual grinding take place at optimum feeds and speeds and that maximum metal removal is achieved in minimum time. Moreover, when differently shaped workpieces are to be finished, it is particularly important to reduce the setup time to a minimum. The drive arrangement for table 24, which is now to be described, enables grinder 20 to efficiently finish workpieces of varying sizes and shapes to high precision.

Figure 2:
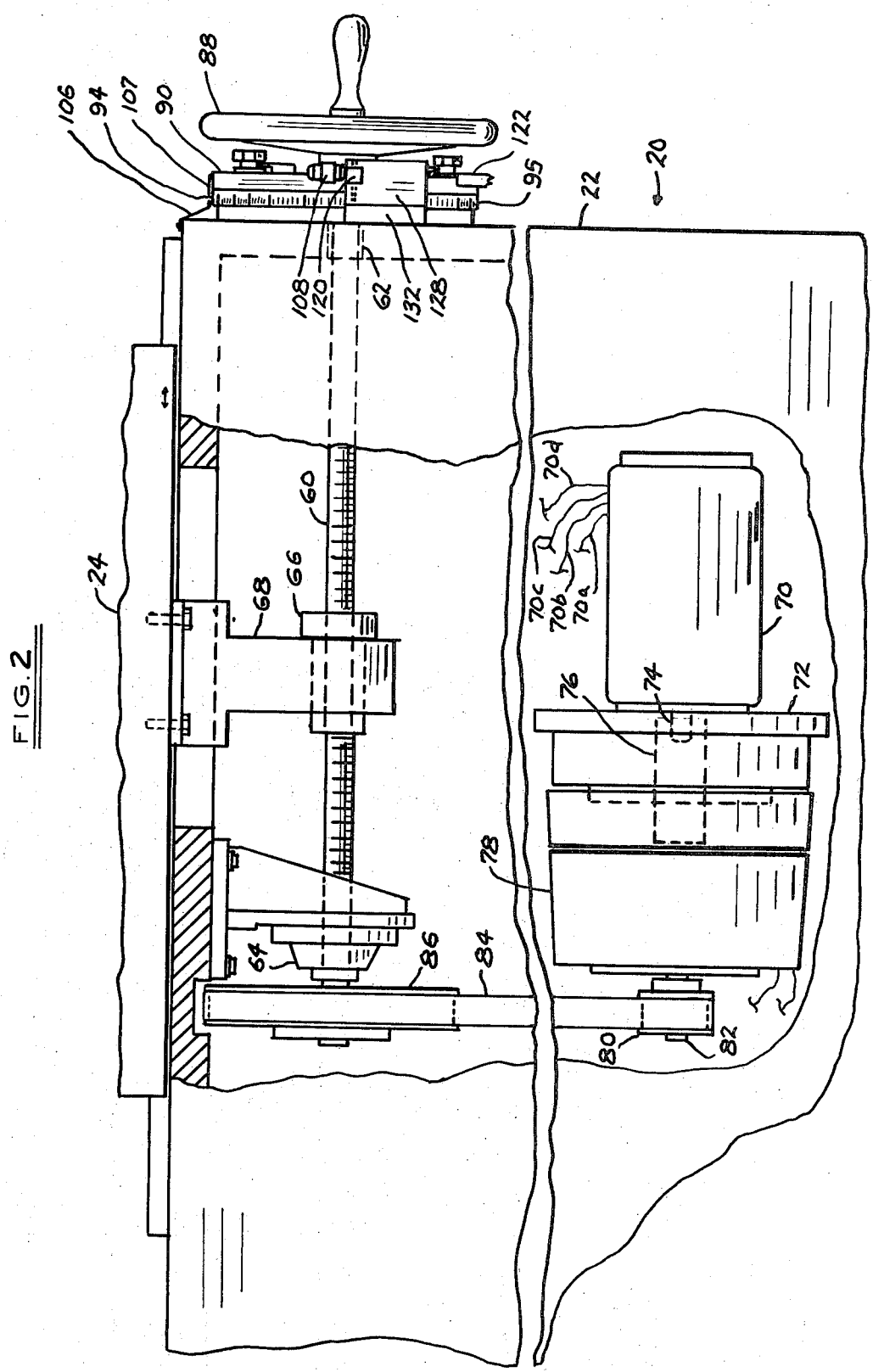
FIG. 2 is an enlarged portion of a left-hand end view of the arrangement of FIG. 1 and having portions broken away.

Referring now to FIGS. 1 and 2, the drive arrangement for table 24 is provided by a lead screw 60 within the upper hollow interior of base 22. The screw shaft ends are journalled in bushings 62 and 64 on base 22. Screw 60 drives a nut 66 (FIG. 2) which is fixedly attached to the underside of table 24 by a bracket 68. The drive for screw 60 is provided by a conventional electric stepping motor 70 which is supported within the lower hollow interior of base 22 on a mounting bracket structure 72. The output shaft 74 of motor 70 is coupled through a sleeve 76 to the rotary input member of an electric clutch 78. A small pulley 80 on the output shaft 82 of clutch 78 is connected by a drive belt 84 to a larger pulley 86 keyed to the rear end of screw shaft 60. Belt 84 is preferably a rubber timing belt which provides a slightly yieldable connection between motor 70 and screw 60. Thus, with clutch 78 engaged, motor shaft 74 may be rotated in opposite directions to similarly rotate screw 60 and thereby shift table 24 inwardly and outwardly. With clutch 78 disengaged, table 24 is operatively disconnected from motor 70 and may be manually positioned by means of a rotary handwheel 88 (FIGS. 1 through 4) whose hub 92 is bored and pinned to the forward external end of screw shaft 60. Because screw 60 has a right-hand lead, counterclockwise rotation of handwheel 88 (in FIG. 4) moves table 24 inwardly, and clockwise rotation outwardly.

Figure 5:
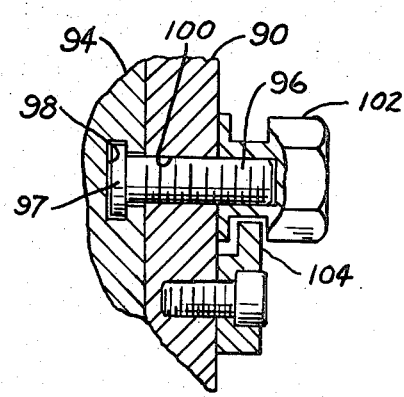
FIG. 5 is an enlarged vertical sectional view taken along line 5—5 in FIG. 4.

The structure adjacent handwheel 88 forms in and out positive mechanical stop and in and out limit switches for table 24. This structure includes an annular dial plate 94 which is affixed on hub 92 of handwheel 88. Dial plate 94 has a graduated dial 95 extending around its circumferential edge. A similarly sized annular stop plate 90 is concentrically journalled on hub 92 between dial plate 94 and handwheel 88. Stop plate 90 is adjustably attached to dial plate 94 by means of a pair of bolts 96 (FIG. 5) whose heads 97 engage a circular T-slot 98 in the front face of dial plate 94. The shanks of bolts 96 extend through holes 100 in stop plate 90 and are drawn outwardly by nuts 102 to thereby clamp the two plates 90 and 94 together for rotation in unison. A key 104 limits the outward movement of each nut 104 to prevent the nuts from coming off bolts 96 when they are unloosened. Nuts 102 may be loosened to permit stop plate 90 to be adjusted on dial plate 94 at setup. Pointers 106 and 107, for use with dial 95, are provided on base 22 and stop plate 90 respectively.

A generally rectangularly-shaped stop arm 108 is attached to stop plate 90 for rotation therewith. The inner end of stop arm 108 is snugly received in a slot 109 formed in the front face of stop plate 90 and is attached thereto by a pair of fasteners 110. The outer end of stop arm 108 projects outwardly beyond the edge of stop plate 90. A pair of stop buttons 112 and 114 are securely attached to the outer end of arm 108 and project perpendicularly away from the opposite side edges of arm 108. The free end, or head, 116, 118 of each button 112, 114 is smoothly rounded for abutment with the limit arms next described.

Figure 3:
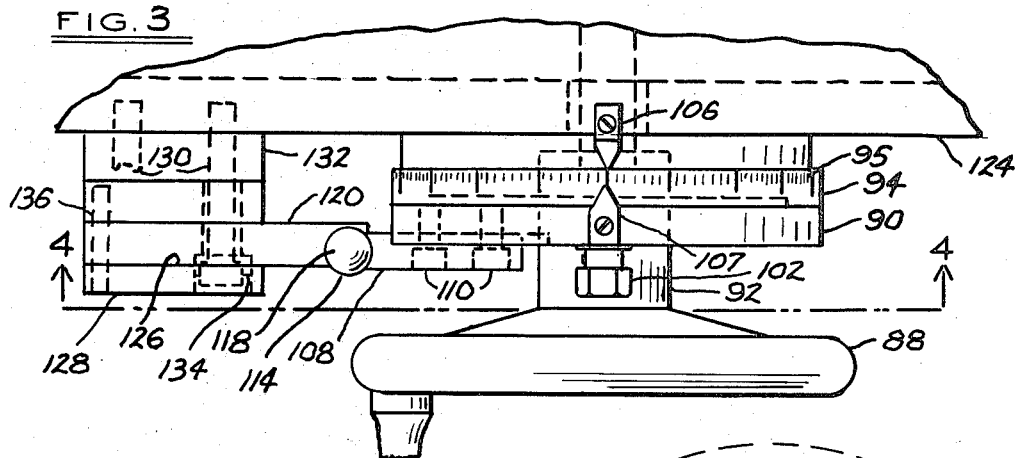
FIG. 3 is an enlarged view taken in circle 3—3 of FIG. 1.
Figure 4:
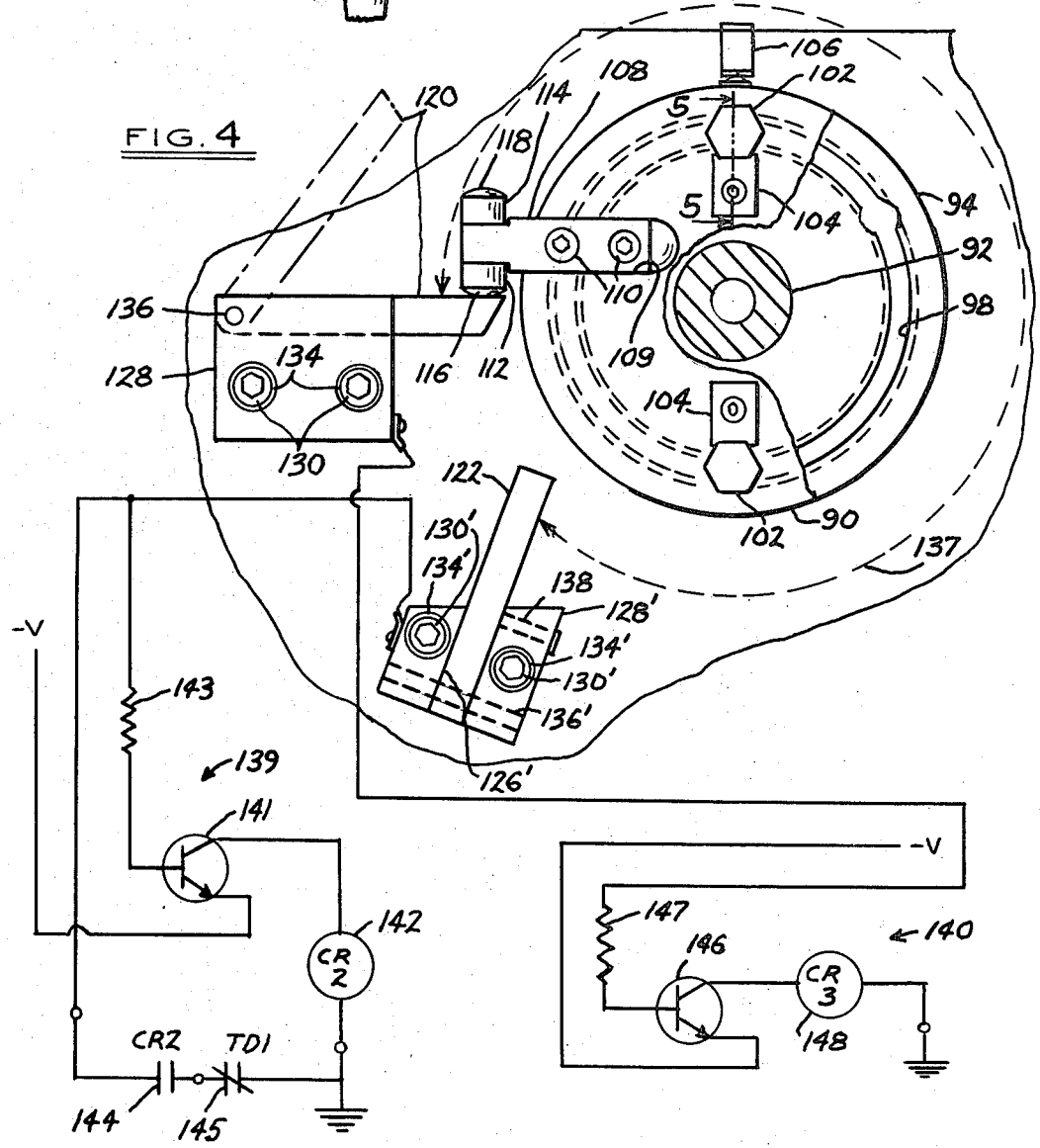
FIG. 4 is a vertical front sectional view taken along line 4—4 in FIG. 3, having a portion broken away and including a schematic representation of a portion of the electronic control circuitry of the invention connected thereto.

An in limit arm 120 and an out limit arm 122 are mounted on the front vertical face 124 of base 22. As can be seen in FIGS. 3 and 4, in limit arm 120 is generally rectangular in shape and is horizontally supported in a close-fitting groove 126 formed in the upper surface of a support block 128. Block 128 is securely attached to front face 124 by a pair of bolts 130. An insulating spacer 132 separates the rear vertical surface of block 128 from base 22, and insulating bushings 134 separate bolts 130 from block 128. The left-hand end of arm 120 is pivoted on a pin 136 to permit arm 120 to be swung counterclockwise out of slot 126 as to the position illustrated by the dot-dash line of FIG. 4. Out limit arm 122 is mounted on base 22 by a generally similar arrangement wherein similar parts are identified by primed numbers corresponding to those used in connection with the mounting of arm 120. Out limit arm 122 may be pivoted outwardly away from base 22 rather than in a plane parallel to the plane of movement of in limit arm 120. A spring loaded plunger 138 is provided in block 128' to retain arm 122 in the position illustrated. When arms 108, 120 and 122 are in the positions illustrated in FIG. 4, the outer end of the top horizontal surface of arm 120 and the outer end of the right-hand side surface of arm 122 are disposed in the rotary path (as identified by arrow 137) of buttons 112 and 114 respectively, thus positively limiting the rotary movement of stop arm 108 and serving to constrain further rotation of screw 60. Because stop arm 108 rotates in unison with screw 60, its position along path 137 is correlated to the position of table 24. Abutment of the rounded heads 116, 118 of buttons 112, 114 with their respective limit arms 120, 122 establishes what are designated as the in and out positive limits of travel of table 24. Hence, with button 112 positively abutting arm 120 as illustrated in FIG. 4, table 24 is at the in positive limit position. Thus, with this arrangement, table travel is constrained to a selected segment of its total possible range of travel. As will be seen later, table 24 moves in a controlled sequence over this selected segment during grinding of workpiece 40 in accordance with the invention. During setup, hereinafter described, arms 120 and 122 are pivoted out of the path of travel of stop buttons 112 and 114 so that table 24 may be approximately positioned relative to grinding wheel 46. Once table 24 is approximately positioned, the two arms are returned to the positions illustrated in FIG. 4 so that the setup may be completed.

In addition to forming positive mechanical stops for limiting movement of table 24, arms 120 and 122 cooperate with buttons 112 and 114 respectively to form in and out limit switches. Electronic circuits 139 and 140 (FIG. 4) are connected to blocks 128' and 128 respectively to sense contact of buttons 114 and 112 with arms 122 and 120 respectively. Circuit 139 comprises an NPN transistor 141 operating as a switch to energize a relay 142 (CR2) when button 114 contacts arm 122. Relay 142 is connected between ground and the collector terminal of transistor 141. The emitter terminal of transistor 141 is biased to -V volts. The base terminal of transistor 141 is connected through a resistor 143 to block 128'. A pair of relay contacts 144 and 145 are serially connected between ground and the terminal of resistor 143 which is connected to block 128'. Buttons 112 and 114 are always grounded by virtue of their mechanical connection through the machine structure to base 22 which is at ground potential. However, because the mounting of arm 122 is electrically insulated from base 22, arm 122 does not become grounded until contacted by button 114. When this happens, a ground is applied through resistor 143 to the base of transistor 141. Transistor 141 is thereby switched on to energize relay 142. Circuit 140 is very similar to circuit 139 and comprises a transistor 146, a resistor 147 and a relay 148 (CR3) connected as illustrated. When button 112 abuts arm 120, a ground is applied through resistor 147 to switch transistor 146 on, thereby energizing relay 148. (While FIG. 4 illustrates button 112 in contact with arm 120 so that relay 148 is energized, the illustrated positions of the contacts of relay 148 in other figures of the drawings are for relay 148 unenergized.) Therefore, it can be seen that arms 120 and 122 cooperate with buttons 112 and 114 to provide electrical limit signals in addition to forming positive mechanical stops for table 24. Moreover, because of the fast circuit response, these signals are generated essentially instantaneously with the arrest of table movement as established by abutment of stop arm 108 with limit arms 120 and 122.

Circuits 139 and 140 along with the electrical controls illustrated in FIGS. 6, 6A and 7 control the operating sequence of grinder 20. Since understanding of the operation of stepping motor 70 is important in understanding the operating sequence of table 24, it is best to now describe the operation of stepping motor 70 and the stepping motor control 150 illustrated in FIG. 7.

Stepping motor 70 is a conventional stepping motor selected to provide sufficient torque capability for driving table 24 by the illustrated drive connection. Motor 70 is connected by four lines 70a, 70b, 70c and 70d to control 150. Control 150 supplies voltage signals via lines 70a, 70b, 70c and 70d in proper sequence to operate stepping motor 70. As is conventional, for each change of signals, motor shaft 74 steps one increment (i.e., rotates a selected angular distance, which is for example 1.8° for a motor having 200 steps per revolution). The particular sequence of signals establishes the direction of rotation of shaft 74, and the rate of change of the sequence, the speed of shaft 74.

Control 150 comprises a control gate 152 which receives inputs via lines 154 through 174 from various control switches and relays as illustrated. (The functions of these switches and relays will be better understood after description of the relay circuits of FIGS. 6 and 6A.) An adjustable oscillator 176 of control 150 is connected to a manually adjustable potentiometer 178 by lines 180, 182 and 184 for controlling the speed of stepping motor 70. Three sets of manually adjustable thumbwheel switches 186, 188 and 190 are connected via connections 192 through 208 to the inputs of three stepping relays 210, 212 and 214 as illustrated. As can be seen in FIG. 7, the three thumbwheel sets 186, 188 and 190 are designated rapid infeed, medium infeed and fine infeed respectively. As will be later seen, these designations refer to particular operating subcycles of grinder 20. More specific details of the construction of switches 186, 188 and 190 and of their connection to relays 210, 212 and 214 will be explained hereinafter. Stepping relays 210, 212 and 214 are in turn connected via connections 216, 218 and 220 to a coincidence circuit 222 of control 150. The stepping relay coils are connected in parallel fashion via connection 224 to the circuitry of FIG. 6A as will be better seen in that figure. Stepping relays 210, 212 and 214 sequentially connect numbers programmed on each thumbwheel set 186, 188 and 190 to coincidence circuit 222 in accordance with the operating subcycle of grinder 20. Control 150 further includes a three-digit electronic counter 226, a pulse gate 228, a translator 230 and a motor run relay 232 (CRM). Control gate 152 and oscillator 176 are connected to pulse gate 228 by connections 234 and 236 respectively. Pulse gate 228 is in turn connected in parallel fashion to counter 226 and translator 230 via connection 238. Translator 230 is connected to the four leads 70a, 70b, 70c and 70d of stepping motor 70. The three digits (i.e., hundreds, tens and units) of counter 226 are connected via connections 240, 242 and 244 respectively to the corresponding digits of coincidence circuit 222. Coincidence circuit 222 is connected back to control gate 152 by line 246 to provide a coincidence signal. Counter 226 may be reset from control gate 152 via line 248. Control gate 152 provides a directional signal to translator 230 via connection 250.

Operation of motor 70 by control 150 is as follows. Oscillator 176 supplies a series of output pulses at connection 236 whose frequency is established by the setting of potentiometer 178. In order to operate stepping motor 70, control gate 152 opens pulse gate 228 via connection 234. Pulses from oscillator 176 are now supplied through gate 228 to both translator 230 and counter 226. The direction of rotation of stepping motor 70 is established by a signal supplied from control gate 152 to translator 230 via connection 250, the selected direction being established by the inputs (hereinafter described) to control gate 152. Translator 230 processes the pulses received from oscillator 176 along with the directional signal received from control gate 152 to generate the proper switching sequence for operating stepping motor 70 one stepping increment per pulse in the selected direction. Counter 226 counts pulses supplied to translator 230 and when coincidence circuit 222 senses coincidence of the pulse count with a reference number supplied via connections 216, 218 and 220, a coincidence signal is supplied via connection 246 to control gate 152. In turn, control gate 152 closes pulse gate 228 to thereby arrest the transmission of pulses to translator 230 and terminate operation of motor 70. Hence, it can be seen that control 150 operates motor 70 in a selected direction at a speed set by potentiometer 178 for a selected number of steps.

With this understanding of the basic operation of motor 70 by control 150, an abbreviated functional description of the grinder operating cycle at this juncture will assist in subsequently understanding the operation of the remaining electrical control circuitry. This cycle is as follows. Assuming that grinder 20 is properly set up for grinding workpieces 40 to a precise selected diameter, a rough workpiece to be ground is first loaded into chucking arrangement 42. At this time, table 24 is at its out limit and cross slide 30 is at a far left work loading/unloading position wherein a dog 149 (FIG. 1) on slide 30 is tripping a far left limit switch 338. Actuation of a cycle-start command turns workpiece 40 via motor reducer 44 and causes cross slide 30 to move to the right to trip limit switch 54 after which it reciprocates laterally between limit switches 52 and 54 until the grinding operation is completed. This same cycle-start command also causes table 24 to move inwardly so as to feed workpiece 40 toward grinding wheel 46. The particular fashion in which workpiece 40 is fed toward grinding wheel 46, that is the fashion in which table 24 moves from the out positive limit position to the in positive limit position, comprises the following four subcycles:

1. A "rapid infeed" subcycle wherein table 24 is moved a selected distance at a selected rate to bring workpiece 40 into very close proximity to or slight contact with wheel 46;

2. A "medium infeed" subcycle wherein table 24 is successively indexed inwardly at the end of each lateral reciprocation of cross slide 30 a selected number of medium-sized increments to begin rough grinding workpiece 40;

3. A "fine infeed" subcycle wherein table 24 is successively indexed inwardly at the end of each lateral reciprocation of cross slide 30 in fine-sized increments until button 112 abuts in limit arm 120 whereby workpiece 40 is fine ground; and 4. A "sparking out" subcycle wherein table 24 is laterally reciprocated a selected number of times after inward movement of table 24 has been arrested by abutment of button 112 with in limit arm 120 whereby workpiece 40 is sparked out.

After the sparking out subcycle, table 24 immediately returns to the out positive limit and cross slide 30 to the workpiece loading/unloading position where the finished workpiece 40 is removed and a new rough workpiece 40 loaded.

The increments of infeed movement of table 24, as set forth in the first three of the above four subcycles, are programmed in the illustrated circuitry by means of three sets of manually adjustable thumbwheel switches 186, 188 and 190. A manually presettable medium infeed counter (to be described in FIG. 6) controls the number of medium-sized increments (medium infeed subcycle) and a similar sparking out counter (also in FIG. 6) controls the number of lateral reciprocations of cross slide 30 during sparking out.

Referring now more specifically to the thumb-wheel switch sets, the rapid infeed increment is manually set on thumbwheel set 186, the medium infeed increment on set 188 and the fine infeed increment on set 190. Each set 186, 188 and 190 comprises three manually adjustable thumbwheel switches. Each individual thumbwheel switch may be set to one of ten different positions so that each set 186, 188 and 190 can supply three-digit decimal information to coincidence circuit 222. It should be understood that each of the connections 192 through 208 comprises a plurality of individual lines for providing the information in coded form. As can be seen, the hundreds digit switch of each set is connected to the hundreds stepping relay 210; similarly for the tens digit switches to the tens stepping relay 212, and for the units digit switches to the units stepping relay 214. At the beginning of an operating cycle, stepping relays 210, 212 and 214 connect set 186, the rapid infeed set, to coincidence circuit 222. The number programmed on set 186 (i.e., the number 600 as shown) determines the number of pulses (600) to be supplied to motor 70 and hence the distance which table 24 moves inwardly during rapid infeed. After the rapid infeed subcycle terminates, a stepping signal is supplied at connection 224 to advance the stepping relays 210, 212 and 214 so that set 188, the medium infeed set, is connected to coincidence circuit 222. The number programmed on set 188 (025) determines the size of the medium infeed indexing increments for table 24. After the medium infeed subcycle terminates, another stepping signal is supplied via connection 224 to stepping relays 210, 212 and 214 to connect set 190, the fine infeed set, to coincidence circuit 222. The number programmed on set 190 (003) determines the size of the fine infeed indexing increment for table 24.

As previously noted, control gate 152 of control 150 is operated by the various switching circuits connected thereto. The relay contacts of these switching circuits are operated by the relay circuit schematically illustrated in FIGS. 6 and 6A. Therefore, it is now appropriate to interrelate the relay circuitry of these latter two figures with the circuitry already described in FIGS. 4 and 7.

The relay control of FIGS. 6 and 6A comprises an AC relay control 260 in FIG. 6 supplied by AC lines L1 and L2, and a DC relay control 262 which continues from the bottom of FIG. 6 to the top of FIG. 6A. To aid in tracing the circuit operation, the lines in the two figures are numbered consecutively from 500 through 537 in increasing order from the top of FIG. 6 through the bottom of FIG. 6A. These numbers are indicated along the right-hand margins of the two figures. As a further aid in tracing the circuit operation, the customary identification of relay contacts with their associated relay coils is provided throughout. (For example, the contacts designated R1 are operated by energizing the relay coil R1.) The relay coils are identified solely by their illustrated designation (e.g., R1) while certain selected contacts are identified numerically in addition to their customary designation (e.g., the relay contacts R9 in line 503 are designated 288). It should also be understood that where only one relay coil is schematically illustrated, in practice more than one relay may be required to provide the necessary number of relay contacts.

Describing now the circuitry of FIGS. 6 and 6A from top to bottom of each figure and beginning at the top of FIG. 6, AC portion 260 includes a clutch control selector switch 264 which controls the engagement of clutch 78 by means of a clutch control 266. When switch 264 is in the "on" position, clutch 78 is engaged to drivingly connect motor 70 to table 24. A counter 268, which is the medium infeed counter previously mentioned, has its counting coil 269 connected with the series string of relay contacts 270, 272 and 274. A second counter 276, which is the aforementioned sparking out counter, has its counting coil 277 connected with the series string of relay contacts 278, 280 and 282. The two counters 268 and 276 each have reset coils 284 and 286 which are connected in parallel and to the single relay contact 288. The two counters 268 and 276 are identical and each operates as follows.

A manually adjustable knob (not shown) on the counter is set to the selected number which is to be counted. The reset coil of the counter is maintained in an energized condition to enable the counter to count. When the counter counting coil is energized and de-energized, a count is registered. Counts accumulate until the accumulated count reaches the selected number set by the adjustable knob at which time the counter operates an internal switch to indicate that the selected count has been reached. This "counted-out" condition is maintained until the counter is reset by de-energizing its reset coil. When the reset coil is again energized, the counter is ready for the next counting cycle.

The remainder of AC circuit 260 sequentially lights indicator lamps 290, 292 and 294 to indicate rapid infeed, medium infeed and fine infeed subcycles respectively.

AC lines L1 and L2 are connected to a rectifier bridge 296 which supplies DC power to the DC control circuitry 262. DC power is sensed by relay coil CRS which closes contacts 300 and 302 to supply the remainder of the DC control. The position of a feed selector switch 304 sets the operating mode of grinder 20 to either manual or automatic. When switch 304 is in automatic, a pair of switch contacts energize automatic mode relay R1. Hence, the various relay contacts R1 are responsive to the grinder operating mode. Following through the mechanical connection of switch 304 to line 522 of FIG. 6A, it can be seen that when switch 304 is in manual, the cross slide at left lateral limit relay R13 and the cross slide at right lateral limit relay R14 may be energized only by operating respective pushbutton switches 312 and 314. With switch 304 in automatic, relays R13 and R14 may be energized only by limit switches 52 and 54 respectively. Relays R13 and R14 reverse the direction of cross slide 30 by any suitable arrangement (not shown) for reversing the rotation of screw 36. At line 530 in FIG. 6A, switch 304 also interlocks a manually operable reset push-button switch 316 used to reset stepping relays 210, 212 and 214, as will be explained later.

Referring back to line 513 in FIG. 6, the energization of the out limit sensing relay R9 is controlled by contacts 320 which are associated with out limit circuit 139 of FIG. 4. The table in motion relay coil TD1 (line 515) is paralleled by an RC series circuit 322 to provide a time delay upon de-energization. Relay TD1 is controlled by normally open contacts 324 which close upon energization of relay 232 (CRM) of control 150 (FIG. 7). The table stopped signal pulse relay coil R2 is in series with relay contacts 328 and 330, the normally closed contacts 330 being opened by energizing relay CRM. Because relay CRM is responsive to operation of motor 70, relays TD1 and R2 are likewise responsive to operation of motor 70 in ways which will hereinafter become apparent.

At line 517 in FIG. 6A, the cycle in progress relay coil R11 is connected to the series contacts 334 and 336 and is energized at the start of a cycle by the closing of contacts 336. The far left limit switch 338 and two contacts 340 and 342 are also connected with relay R11 as illustrated. (Switch 338 assumes the position illustrated when not being tripped by dog 149.) The various contacts designated R11 are operated when an operating cycle is in progress.

The cycle stop relay R12 is electrically connected to a cycle stop switch 346 and to contacts 348, 350 and 352 as shown. Relay R12 is energized either when the sparking out subcycle is complete or when the operating cycle is prematurely stopped by actuation of switch 346. The rapid return relay coil R7 is connected in parallel with relay R12 via contacts 356. Relay R7 operates to return table 24 to the out positive limit whenever relay R12 is operated.

At line 524 in FIG. 6A, the end of subcycle relay coil R3 is connected as illustrated to contacts 360 through 370. As will become apparent, when relay R3 is energized to indicate the end of a subcycle, stepping relays 210, 212 and 214 advance.

The end of medium infeed subcycle relay coil TD2 is paralleled by an RC delay circuit 322 to provide a time delay upon de-energization. Relay TD2 is controlled by contacts 374 and energization thereof indicates the completion of the medium infeed subcycle.

The end of rapid infeed subcycle relay coil R4 is controlled by contacts 378 and 380 and becomes energized when the rapid infeed cycle terminates.

Stepping relays 210, 212 and 214 are controlled by the series switches 304 and 316 previously described and also contacts 382. When relay R3 is energized to indicate the end of one of the subcycles, contacts 382 close to energize the coils of stepping relays 210, 212 and 214 and thereby sequentially operate sets of contacts within relays 210, 212 and 214. With this arrangement, the sets of thumbwheel switches 186, 188 and 190 are successively connected to control 150 in accordance with the operating cycle.

The initiate index relay coil R6 is connected as illustrated to contacts 386 through 392 and initiates indexing of table 24 when the cycle is in either the medium or fine infeed subcycle.

The enable medium infeed subcycle relay coil R5 is connected as illustrated to contacts 396 through 402. Relay R5 operates after the termination of the rapid infeed subcycle to enable initiation of the medium infeed subcycle.

The in limit sensing relay coil R8 is connected to contacts 406 and 408 as illustrated and is energized when table 24 hits the in positive limit. Although abutment of button 112 with in limit arm 120, as shown in FIG. 4, would energize relay CR3, the illustrated position of contacts 406 occurs when relay CR3 is unenergized.

Returning now to FIG. 7, the designations of the various contacts connected to control gate 152 can be better understood. The cycle start circuit 409 includes the cycle-start switch 410 and contacts 412 through 418 electrically connected to control gate 152 via lines 154 and 156. In automatic, contacts 414 close and switch 410 may be operated and released to momentarily close the circuit between lines 154 and 156 thereby initiating an operating cycle by initiating the rapid infeed subcycle thereof. Contacts 416 close and open to initiate indexing of table 24 during the medium and fine infeed subcycles.

The direction control circuit 419 includes the direction selector switch 420 and relay contacts 422 and 424 connected via lines 158, 160 and 162 to control gate 152, as shown. Direction control circuit 419 is used in conjunction with the jog and run circuits hereinafter described. In automatic, contacts 424 close to complete a circuit between lines 160 and 162, and contacts 422 open to prevent switch 420 from completing a circuit between lines 158 and 160. Under this condition, control gate 152 can operate motor 70 in only the direction which feeds table 24 inwardly. However, in manual, contacts 424 open the circuit between lines 160 and 162, whereas contacts 422 close to enable a circuit to be completed between lines 158 and 160 whenever switch 420 is closed. In this condition, the position of switch 420 determines the direction of movement of table 24. When switch 420 is open, table 24 can only move inwardly; when closed, only outwardly. Control gate 152 provides the proper directional signal, as established by switch 420, to translator 230 via connection 250.

The jog circuit 425 comprises a jog switch 426 connected in series with a contact 428 to control gate 152 via lines 164 and 166. Only in manual can jog switch 426 be operated to complete a circuit between lines 164 and 166. Each time switch 426 is depressed and released, a single pulse is supplied to translator 230 to step shaft 74 of motor 70 one stepping increment in the direction selected by direction switch 420 and thereby move table 24 one corresponding linear increment in the corresponding direction.

The run circuit 429 comprises a run switch 430 and contacts 432 and 434 connected as illustrated to control gate 152 by lines 168 and 170. Here too, only in manual can switch 430 be operated to close the circuit between lines 168 and 170. As long as switch 430 is depressed, pulses are supplied to translator 230 to move table 24 in the direction selected by direction switch 420. On the other hand, in automatic, contacts 434 customarily close only after sparking out to cooperate with the reverse circuit (to be next described) in returning table 24 to the out positive limit.

The reverse circuit 435 includes the parallel contacts 436 and 438 connected via lines 172 and 174 to control gate 152. Whenever either contacts 436 or 438 close, the completed circuit between lines 172 and 174 permits table 24 to move only in the out direction. While contacts 438 alone are sufficient to properly operate the control, contacts 436 are provided as a safety so that should contacts 438 fail for any reason, energization of relay R7 would cause both contacts 434 and 436 to close and thereby move table 24 and workpiece 40 outwardly away from grinding wheel 46.

The complete operating cycle of grinder 20 embodying the electromechanical drive arrangement of the present invention can now be fully understood. At the beginning of a cycle, table 24 is at the out positive limit with button 114 abutting arm 22. Cross slide 30 is at its far left limit with dog 56 tripping limit switch 338. Clutch switch 264 is "on" and feed switch 304 is in automatic. For purposes of illustration, the numbers 600, 025 and 003 are dialed on thumbwheel switches 186, 188 and 190 respectively. Also, the medium infeed counter 268 is set to the number six and the spark out counter 276 to the number five.

A cycle is initiated by operating cycle-start switch 410 to complete a circuit between lines 154 and 156 to control gate 152. Because the control is in automatic, the direction, jog and run circuits 419, 425 and 429 are inoperative. Because contacts 436 and 438 in reverse circuit 435 are open, table 24 can move only inwardly. An additional set of contacts (not shown) of switch 410 also closes upon actuation thereof to start cross slide 30 moving to the right in FIG. 1 and to begin turning workpiece 49. As indicated, stepping relays 210, 212 and 214 connect the programmed number 600 on the rapid infeed switches 186 to coincidence circuit 222.

Control gate 152 responds to the cycle-start signal by opening pulse gate 228 so that pulses are supplied to counter 226 and translator 230 at a rate set by speed potentiometer 178. This starts the rapid infeed subcycle, and therefore table 24 moves inwardly until the count in counter 226 equals the number 600. Coincidence circuit 222 senses coincidence of the count with the programmed increment of rapid infeed movement and supplies a coincidence signal to control gate 152. Control gate 152 in turn closes gate 228 so that further table movement is prevented. After this, counter 226 is reset to zero by control gate 152 via connection 248. This completes the rapid infeed subcycle and workpiece 40 is now positioned very closely to or slightly contacting grinding wheel 46.

At the beginning of the rapid infeed subcycle, the relay CR2 (FIG. 4) is energized because slide 24 is at the out positive limit position with button 114 contacting out limit arm 122. Because relay TD1 is not energized at this time, relay CR2 is sealed via contacts 144 and 145. Upon initiation of the rapid infeed subcycle, relay 232 (CRM) of control 150 is energized to indicate that motor 70 is being operated; thus contacts 324 (line 515) close to energize relay TD1 thereby opening contacts 145 in circuit 139. Depending upon the response times of the various circuit elements, relay CR2 is de-energized upon the later occurring of (1) disengagement of button 114 and arm 122 and (2) the opening of contacts 145. With relay CR2 de-energized, contacts 320 (line 513) close to thereby energize relay R9 indicating that table 24 has left the out positive limit. Relay R9 in turn closes contacts 336 (line 517), 356 (line 520) and 359 (line 523).

When table 24 completes its programmed rapid infeed increment, contacts 324 open and contacts 330 close. The delay in de-energization of relay TD1 maintains contacts 328 (line 516) closed for a certain time after contacts 330 close so that relay R2 (line 516) is momentarily energized. This momentary energization of relay R2 provides (via contacts R2) what is termed a stop signal pulse. This pulse, in the form of a momentary closure of contacts 368 (line 525), in turn momentarily energizes relay R3 (line 524) to indicate the end of a subcycle. In turn, contacts 378 (line 529) momentarily close to energize relay R4. The energization of relay R4 is not momentary however, because contacts 380 (line 528) close to seal relay R4. The energization of relay R4 indicates that the rapid infeed subcycle has terminated. The momentary energization of relay R3 also advances stepping relays 210, 212 and 214 via contacts 382 (line 531) to connect the medium infeed thumb-wheel switches 188 to coincidence circuit 222. It should therefore be recognized that the delay in de-energization of relay TD1 must be sufficiently long to enable relay R4 to seal itself in and to advance stepping relays 210, 212 and 214 to the next position.

When the rapid infeed subcycle terminates, the lateral position of cross slide 30 can vary depending upon the speeds of table 24 and slide 30 and the amount of rapid infeed. As long as cross slide 30 is not tripping one of the limit switches 52 and 54 when the rapid infeed subcycle ends, neither relay R13 (line 522) nor relay R14 (line 523) is energized. Therefore, because contacts 396 and 400 remain closed, (line 534) relay R5 is energized by closure of contacts 402 at the end of the rapid infeed subcycle. The energized relay R5 seals itself via contacts 398. Of course, should cross slide 30 be tripping one of the lateral limit switches 52 or 54 when the rapid infeed subcycle terminates, relay R5 is not energized until slide 30 moves off the limit. Energization of relay R5 enables the medium infeed subcycle to be initiated when cross slide 30 trips the lateral limit switch 52 or 54 toward which it is headed. Thus, there is always some delay between the end of the rapid infeed subcycle and the beginning of the medium infeed subcycle, depending upon the lateral position of cross slide 30 at the end of the rapid infeed subcycle.

Therefore, assuming that cross slide 30 is still moving to the right in FIG. 1, when the rapid infeed of table 24 ceases (as is usually the case), limit switch 54 will be subsequently tripped to energize relay R14. When this happens, relay R14 closes contacts 386 (line 532) to energize relay R6 through the normally closed contacts 390 and the contacts 392 which have been closed by energization of relay R5. Relay R6 remains energized only while switch 54 is tripped. This momentary energization, however, is sufficiently long to close contacts 416 in the cycle-start circuit 409 (FIG. 7) which operate control gate 152 to initiate medium infeed. Thus, at the start of the medium infeed subcycle, control 150 operates to feed table 24 inwardly a first medium-sized increment as established by the number programmed on the medium infeed thumbwheel switches 188.

The first medium infeed index of table 24 operates relays TD1 (line 515) and R2 (line 516) in the same manner described in connection with the rapid infeed subcycle so that relay R2 produces a stop signal pulse at the end of the medium infeed increment of travel of table 24. Momentary energization of relay R2 momentarily closes and opens contacts 274 (line 502) to register one count in medium infeed counter 268, contacts 274 having been already closed by relay R5. Workpiece 40 now passes across grinding wheel 46 heading toward limit switch 52 and depending upon the tolerances of the rough workpiece, some actual grinding may take place. (This aspect will be more fully discussed later in connection with the setup procedure.)

When cross slide 30 trips limit switch 52, cross slide 30 reverses table 24, indexes a second increment of medium infeed and a second count registers in counter 268. This process is repeated until the count in medium infeed counter 268 equals the preset number of counts; in this case, six counts. When cross slide 30 trips limit switch 52 for the third time immediately after the fifth pass of workpiece 40 across grinding wheel 46 during the medium infeed subcycle, table 24 indexes a sixth medium infeed increment and the sixth count registers in counter 268. With limit switch 52 still being tripped, the just-registered sixth count in counter 268 closes contacts 360 (line 524) and opens contacts 374 (line 527). Now, as cross slide 30 moves to the right to begin its sixth pass, limit switch 52 is released, and thus relay R6 is de-energized by contacts 388 opening. This causes contacts 362 (line 524) to return to the normally closed position and thereby momentarily energize relay R3 indicating the end of a subcycle. This momentary energization is permitted by providing a delay in de-energization of relay TD2 which is sufficiently long to maintain contacts 364 closed for a time after contacts 362 close. Moreover, the delay is sufficiently great to maintain relay R3 energized so that stepping relays 210, 212 and 214 may be again advanced. While this momentary energization of relay R3 indicates the end of the medium infeed subcycle, cross slide 30 is permitted to complete its sixth pass (third pass to the right in FIG. 1). Contacts 270 (line 502), which are internal of counter 268, open upon the sixth count being registered in counter 268 to insure that no more counts are supplied to counter coil 269.

When cross slide 30 now trips limit switch 54, the fine infeed subcycle commences with table 24 moving inwardly a first fine infeed increment because fine infeed thumbwheel switches 190 are not connected to coincidence circuit 222. As cross slide 30 now returns to the left in FIG. 1, a much thinner layer of material is removed from workpiece 40. Cross slide 30 continues to reciprocate laterally and table 24 indexes inwardly a fine infeed increment at each lateral limit of cross slide 30 until table 24 comes to the in positive limit as established by the abutment of button 112 with in limit arm 120. Such abutment in all probability will occur at a position other than the end of a fine in-feed indexing increment. This is not a problem, however, because either the yieldable rubber belt 84 can absorb the slight excess of the commanded movement of shaft 74 of motor 70 or the stepping motor can be stalled without damage. Abutment of button 112 with arm 120 energizes relay CR3 (FIG. 4) whose contacts 406 (line 536) close to energize relay R8 thus indicating that table 24 is at the in positive limit. Relay R8 seals itself via contacts 408 and also closes contacts 278 (line 505) and contacts 370 (line 526). Because this is all happening while cross slide 30 is still at one of its lateral limits, relay R3 is momentarily energized via contacts 368 and 370 to indicate the end of a subcycle (in this instance the fine infeed subcycle).

The sparking out subcycle now commences. Stepping relays 210, 212 and 214 are again stepped and relay R6 is energized to close contacts 282 (line 505) and contacts 416 in the cycle-start circuit 409 of FIG. 7. However, in the cycle-start circuit 409, it can be seen that control 150 is not operated because contacts 418 have been opened by the now energized in limit sensing relay R8. Hence, although relay R8 attempts to initiate an index of table 24, such index is prevented. Now, as cross slide 30 releases the lateral limit switch which it was tripping to begin the first sparking out pass of workpiece 40 across grinding wheel 46, contacts 282 (line 505) open to register a count in sparking out counter 276. At the beginning of the fifth sparking out pass, the fifth count registers in sparking out counter 276 which operates contacts 350 (line 521) and contacts 438 in the reverse circuit 435 of FIG. 7. Contacts 350 energize relay R12 directly and relay R7 via the closed contacts 356. Relay R12 seals via contacts 352 and 336, and opens contacts 334 (line 517) and 340 (line 519). Simultaneously, relay R7 closes contacts 434 in the run circuit 429 of FIG. 7. With contacts 434 and 438 now closed, control 150 operates stepping motor 70 such that table 24 is immediately returned to the out positive limit at a rate established by the setting of potentiometer 178. At the same time, cross slide 30 is moved by other circuitry (not shown) toward its far left limit. Hence, the actual number of sparking out passes is one less than the number preset on sparking out counter 276.

The circuit arrangement is such that it is unimportant whether cross slide 30 comes to its far left limit before table 24 comes to the out positive limit. If table 24 comes to the out positive limit first, abutment of button 114 with out limit arm 122 energizes relay CR2 (FIG. 4) to drop out relay R9 (line 513). De-energization of relay R9 opens contacts 359 (line 523) to reset the portion of DC circuit 262 in the lower half of FIG. 6A, opens contacts 288 (line 503) to reset counters 268 and 276, opens contacts 356 (line 520) to drop out relay R7 and opens contacts 350 (line 521). De-energization of relay R7 opens contacts 434 and 436 (FIG. 7) to terminate the operation of stepping motor 70. Although contacts 350 are now open, relay R12 remains energized because the far left limit switch 338 remains closed to maintain relay R11 (line 517) energized. When far left limit switch 338 is tripped, relay R11 drops out and in turn relay R12 is dropped out by contacts 348 to complete the cycle.

On the other hand, if cross slide 30 trips switch 338 before table 24 comes to the out positive limit, relay R12 still cannot be energized until contacts 350 close.

In this case, once relay R12 energizes, relay R11 immediately drops out and relay R12 will later be dropped out when counter 276 is reset (as previously described) to complete one operating cycle.

Before describing the setup procedure, a brief explanation of the dimensional characteristics of the preferred embodiment will illustrate its high precision capability. Stepping motor 70 rotates 1.8° for each pulse received by translator 230 and thus one revolution per 200 pulses. The ratio of pulley 86 to pulley 80 is 5:1 and therefore screw 60 rotates one revolution per 1,000 pulses. Because the lead of screw 60 is 0.100 inch, table 24 moves 0.0001 inch per pulse. Screw 60 is constrained by the in and out positive stops for rotation over approximately 280°, and hence table 24 is constrained for approximately 0.0780 inch of movement between in and out positive limit positions (780 pulses). The diameters of plates 90 and 94 are on the order of 5 inches and dial 95 is provided with 200 equally spaced graduations which are calibrated in terms for workpiece diameters. The graduations are numbered from 0.001 inch to 0.200 inch in the clockwise direction with two increments of dial 95 (i.e., 0.002 inch) corresponding to one increment (i.e., 0.001 inch) of table travel. The resolution of dial 95 permits table 24 to be positioned by eye within a few ten-thousandths of an inch.

The preferred setup procedure to be now described for grinder 20 presumes that the diameter of the first rough workpiece 40 equals the nominal diameter. Accordingly, it is not the only procedure which may be used. With feed selector switch 304 set to manual, clutch switch 264 to off and limit arms 120 and 122 swung out of the path of stop arm 108, a rough workpiece 40 is loaded in chucking arrangement 42 and grinding wheel 46 is operated. Table 24 is positioned by means of handwheel 88 so that wheel 46 just touches workpiece 40 (it is unnecessary to operate cross slide 30 at this time). The position of table 24 is noted by reading the alignment of dial 95 with pointer 106. For purposes of illustration, it is assumed that this reading is 0.150 inch. The amount by which the presumed nominal diameter must be reduced is computed by subtracting the diameter of the finished workpiece from the nominal diameter of the rough workpiece. Assuming the nominal diameter equals 1.050 inches and the finished diameter 1.000 inch, then 0.050 inch must be taken off the diameter. This computed number (0.050 inch) is added to the reading (0.150 inch) to establish the in positive limit position. The out positive limit position is calculated by subtracting twice the total amount of table travel from the in positive limit position. Therefore, the out positive limit is computed by subtracting 0.1560 inch (i.e., 2 × 0.0780 inch) from 0.200 inch and this computed figure (0.0440 inch) represents the out positive limit position.

Handwheel 88 is operated to position table 24 to the calculated out limit position. Out limit arm 122 is redisposed in the path of stop arm 108. Nuts 102 are loosened so that stop plate 90 may be adjusted on dial plate 94 to bring button 114 into abutment with out limit arm 122. Nuts 102 are again tightened and in limit arm 120 is swung back into the path of stop arm 118. The amount of rapid infeed travel to be set on switches 186 is computed from the knowledge of the dimensional tolerances of the rough workpieces 40 to preferably bring workpiece 40 into close proximity with grinding wheel 46. (It should be noted that in some instances it may be permissible to plunge workpiece 40 slightly into grinding wheel 46 during rapid infeed whereas in other instances it may not.) The size and the number of medium infeed increments and the size of the fine infeed increments are calculated from the dimensions involved along with knowledge of the grinding characteristics of the material of workpiece 40. Depending upon the grinding characteristics of the workpiece material, relatively large or relatively small medium infeed increments may be programmed to begin grinding the workpiece. Of course, the greater the size of the medium infeed increments, the less number of medium infeed cycles are required to bring table 24 to the position where workpiece 40 is ready to be ground in fine increments. The size of the fine infeed increment is also established by the grinding characteristics of the material, and the number of sparking out cycles required depends upon the degree of precision to which the workpiece is to be finish ground.

Therefore, with table 24 still at the out limit position, the rapid, medium and fine infeed increments are programmed on switches 186, 188 and 190, the number of medium infeed cycles and the number of sparking out cycles are set on counters 268 and 276 respectively, clutch switch 264 is switched to on, feed switch 304 to automatic and push-button switch 410 operated to start the grinding cycle.

Upon cycle completion, the finished workpiece is removed and dimensionally checked to determine if further adjustment of stop plate 90 on dial plate 94 is required. (In all probability, a slight adjustment will be necessary.) It is preferable to adjust stop plate 90 such that the diameters of the finished workpieces are at their low side of tolerance because as grinding wheel 46 wears over the course of grinding a number of workpieces, the diameters of the finished workpieces gradually increase. Hence, as wheel 46 wears, the workpieces are maintained within tolerance until the wear of wheel 46 becomes excessive. At this time, a further adjustment is made in the positions of the in and out limits be readjusting stop plate 90 on dial plate 94 with the aid of pointer 107. Stop plate 90 is rotated just enough on dial plate 94 to bring the diameter of the finished workpieces back to their low side of tolerance.

As previously noted, the improved grinding efficiency is achieved by precisely controlling the movement of table 24 between the in and out positive limits. Although the speed of motor 70 is manually set by potentiometer 178 and hence is the same throughout all subcycles, the setting thereof permits table 24 to rapidly advance during the rapid infeed subcycle and to rapidly retract to the out positive limit when the sparking out subcycle is completed and does not adversely affect the grinding operation when table 24 is indexed inwardly. In this way, actual grinding takes place for a maximum percentage of each operating cycle. It should be pointed out that because of the high mechanical advantage from motor 70 to table 24, the additional load on motor 70 during feeding of workpiece 40 into grinding wheel 46 is only a small percentage of the load on motor 70 when operating table 24 alone and therefore it is unnecessary to move workpiece 40 off grinding wheel 46 when indexing table 24 inwardly. The characteristics of the stepping motor are highly advantageous, particularly the fast response of the motor to starting and stopping signals and the accuracy with which the motor shaft may be rotated. For example, upon abutment of stop arm 108 with either the in or out positive limit arms 120 and 122, operation of motor 70 is essentially instantaneously stopped so that it is impossible during normal operation for shaft 74 to step more than one or two increments (i.e., 0.0001 inch or 0.0002 inch) beyond its commanded position. Any overtravel as might occur could be absorbed by the yieldable belt 84, or even should the motor stall, it would not be damaged because the construction of stepping motor 70, unlike other types of motors, permits shaft 74 to be stalled without damaging the motor. Therefore, should a failure occur which causes operating signals to be supplied to motor 70 when table 24 is positively abutting either in or out positive limits, the motor cannot be damaged.

The above description has presumed zero backlash between screw 60 and nut 66, and preferably the two are constructed to have as little backlash as possible. While it should be clearly understood that because table 24 is always brought to the in positive limit via arm 108 positively abutting arm 120, any backlash between screw 60 and nut 66 does not affect the precision of the finished workpieces, it should also be understood that backlash between screw 60 and nut 66 can reduce the efficiency of the grinding operation unless compensated for. This reduced efficiency occurs because on the infeed stroke, backlash is taken out at the beginning of the rapid infeed subcycle. Thus, table 24 moves inwardly a distance less than the commanded distance set on rapid infeed thumbwheel set 186 and consequently because the distance to be travelled during medium infeed is fixed, a greater distance must be traversed during the fine infeed subcycle. This greatly adds to the total time of a cycle. Backlash compensation may be performed by determining the amount of backlash and then adding this amount to the amount of programmed rapid infeed movement which would be programmed were there zero backlash. It is to be observed that backlash does not adversely affect the operation of table 24 when returning to the out positive limit position because pulses are continuously supplied to motor 70 until arm 108 positively abuts out limit arm 122.

The particular stepping relays used in the preferred embodiment (see parts list at end of specification) actually have 12 stepping increments. Therefore, because the preferred embodiment has only three infeed subcycles, the relay contacts associated with every third step are wired together so that the three sets of thumbwheel switches are properly connected in sequence as the stepping relays advance. Preferably, an indicator lamp is wired to the stepping relays to light when the relays are connecting the thumbwheel switch set 186 to control 150; that is to indicate when the relays are set to the rapid infeed subcycle. When the control is manual, relays 210, 212 and 214 may be stepped by push button 316 (FIG. 6A).

The invention provides great versatility for a precision grinder while maintaining precision operation thereof. Thumbwheel switches for programming the various infeed increments and presettable counters for controlling the number of cycles in the medium and sparking out subcycles provide an exceedingly great number of possible combinations for operating grinder 20. It should be understood, of course, that in certain instances it may be unnecessary to utilize the full capability of the preferred embodiment. For example, where the quality of the rough workpieces is very good, it may be unnecessary to utilize the medium infeed subcycle. Furthermore, it may not always be necessary to use the sparking out subcycle. It should also be apparent from the foregoing description that setup and adjustment of grinder 20 may be expeditiously performed by skilled personnel, and once so set and adjusted, the grinder may be operated on a production basis by less skilled personnel. The following is a list of certain components used in the preferred embodiment and it is to be understood that such disclosure is intended to set forth an exemplary and not a limiting embodiment.

Stepping Motor 70 (Model No. HS–400B–1003) Manufactured by Superior Electric Company, Bristol, Connecticut Clutch 78 (Model No. EM50–1040) Manufactured by Warner Electric, Clutch Control 266 (Model No. 5400–24) Manufactured by Warner Electric, Stepping Relays 210, 212, 214 (Model No. Manufactured by Counters 268, 276 (Model No. HZ172–A6) Manufactured by Eagle Signal, Control 150 (Model No. SP1800B–3) Manufactured by Superior Electric Company, Bristol, Connecticut

I claim:

1. In a production grinding machine of the type having a base, a work holder on said base for rotatably supporting a workpiece, a rotary driven grinding wheel on said base, means for reciprocating the work holder relative to the wheel through a predetermined longitudinal stroke generally parallel to the rotary axis of the wheel to execute a pass of the wheel along the length of the workpiece and for reciprocating the work holder relative to the wheel through a predetermined transverse stroke toward and away from the wheel, the combination comprising: means for limiting the transverse travel of the work holder relative to the wheel to a fixed predetermined stroke shorter than said predetermined transverse stroke comprising an in limit positive stop fixed on said base, an out limit positive stop fixed on said base and abutment means movable in correlation to the relative transverse movement of said work holder and adapted to interengage said in and out positive stops to thereby constrain travel of the work head in said transverse direction to said shorter stroke; said abutment means being adjustable relative to said positive stops such that, when the abutment means engages the in positive stop, the periphery of the grinding wheel is disposed tangentially to a surface of revolution of the workpiece at the desired finish ground dimension thereof; means for feeding said work holder in said transverse direction relative to said wheel from said out limit position to said in limit position in a plurality of successive increments; means for preselecting the number of said successive increments and the size thereof so that they cummulatively correspond at least generally with the magnitude of said shorter stroke; and electrical control circuit means for moving said work holder relative to said wheel in the following manner: first moving the work holder inwardly from its out limit position a first increment to a first position intermediate said in and out limit positions wherein the periphery of the grinding wheel is disposed tangent to a surface of revolution of the workpiece which corresponds generally to the predetermined initial dimension of the workpiece to be ground; causing the work holder to reciprocate lengthwise relative to the grinding wheel at said first position to execute an initial pass of the grinding wheel along the length of the workpiece and remove stock therefrom at a surface of revolution of the workpiece which may be dimensionally greater than said predetermined initial dimension of the workpiece; thereafter progressively moving the work holder inwardly from said first position toward said in positive stop in a plurality of successive increments smaller than said first increment until said abutment means engages said in positive stop; reciprocating the work holder longitudinally relative to the wheel following each successive incremental movement of the work holder toward the wheel whereby to progressively grind the workpiece to its finished dimension by means of a plurality of lengthwise strokes of the work holder relative to the wheel until the abutment means engages the in limit positive stop; and then moving the work holder relative to the wheel outwardly to said out limit position.

2. The combination of claim 1 wherein said control circuit means includes means for moving said work holder inwardly relative to said wheel through a first series of at least one indexing increment to a second position intermediate said first position and said in limit position and then through a second series of a plurality of indexing increments from said second position to said in limit position and wherein each increment of said first series is smaller than said first increment and larger than each of the successive increments of said second series.

3. The combination of claim 2 wherein said means for selecting the number and size of said indexing increments comprises programmable switch means in said control circuit means.

4. The combination of claim 3 wherein said switch means are adapted to be manually set to produce indexing increments in said first series of equal size.

5. The combination of claim 4 wherein said switch means are adapted to be manually set for producing indexing increments in said second series prior to the last indexing increment of equal size.

6. The combination of claim 1 wherein said reciprocation means comprises electrically controlled drive means and said control circuit means comprises in limit sensing circuit means for producing an in limit signal when the abutment means engages said in limit stop, out limit sensing circuit means for producing an out limit signal when the abutment means engages said out limit stop, means responsive to said in limit signal for conditioning said drive means to move the work holder relative to the wheel outwardly to said out limit stop with an uninterrupted motion and means responsive to said out limit signal for arresting actuation of the drive means.

7. The combination of claim 6 wherein said drive means comprises an electric stepping motor and including means in said control circuit for producing control signals to operate said stepping motor to produce relative inward and outward movement of the work holder, said last-mentioned means being responsive to said in limit signal for arresting the transmission of signals to said stepping motor.

8. The combination of claim 6 including means cooperating with the means for reciprocating the work holder longitudinally relative to the wheel and responsive to said in limit signal for reciprocating the work holder transversely relative to the wheel a selective number of strokes prior to retracting the work holder to said out limit position.

9. The combination of claim 6 wherein said abutment means and said in limit positive stop comprise electrical conductors which are electrically insulated from one another and said in limit sensing circuit means includes means electrically interconnecting said abutment means and said in limit stop for producing said in limit signal when said abutment means contact said in limit stop.

10. The combination of claim 1 wherein said abutment means and said stops are mounted for relative movement from an operative position wherein said stops are engaged by the abutment means to limit travel of the work holder to said shorter stroke to a stop-bypassing position for enabling relative movement of the work holder toward and away from the wheel beyond the inner and outer limits of said shorter stroke as determined by said stops.

* * * * *